April 15, 1941.  H. J. LOUNSBURY  2,238,227
COMBINED SPRING AND FRICTION SHOCK ABSORBER
Filed March 29, 1939   3 Sheets-Sheet 2
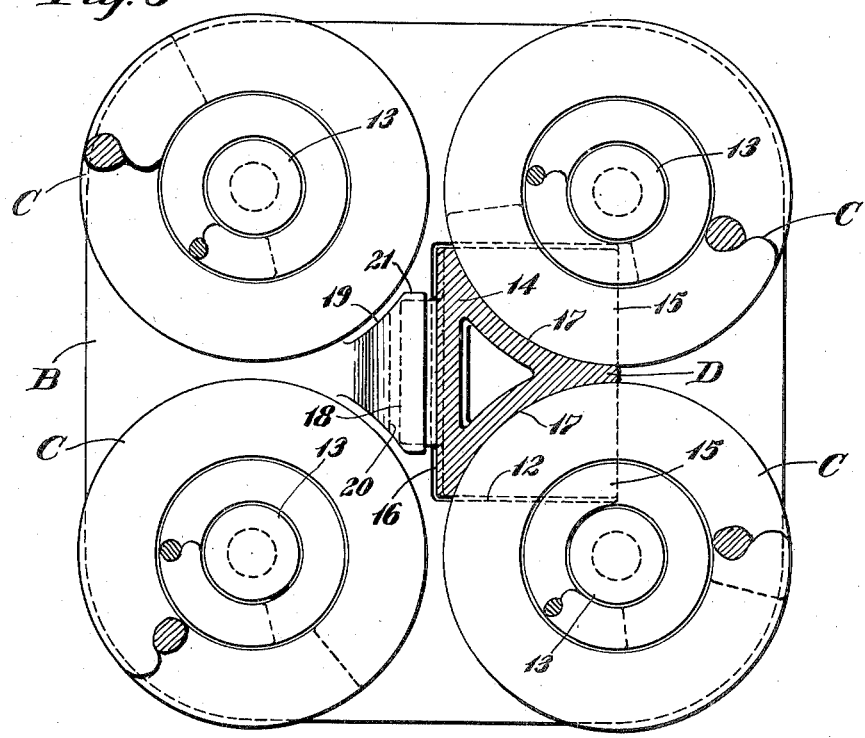
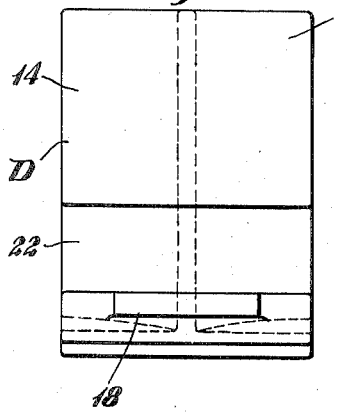
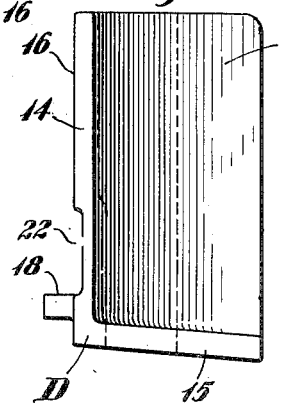
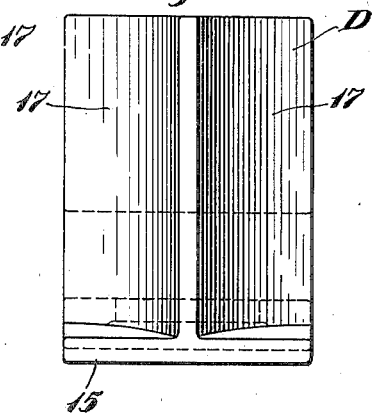
Inventor
Harvey J. Lounsbury
By Henry Fuchs
Atty.

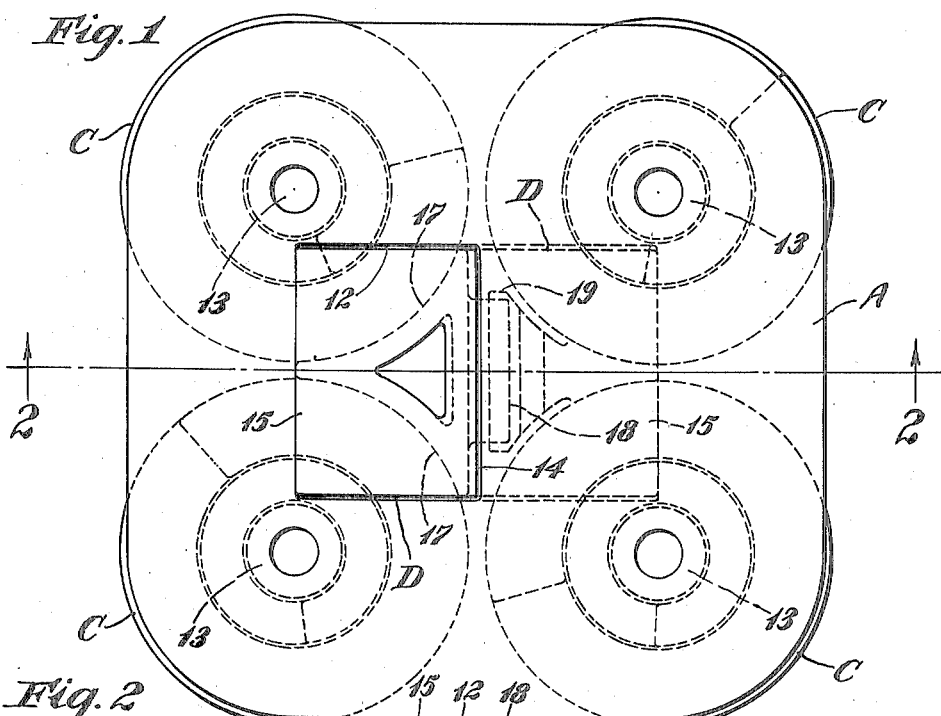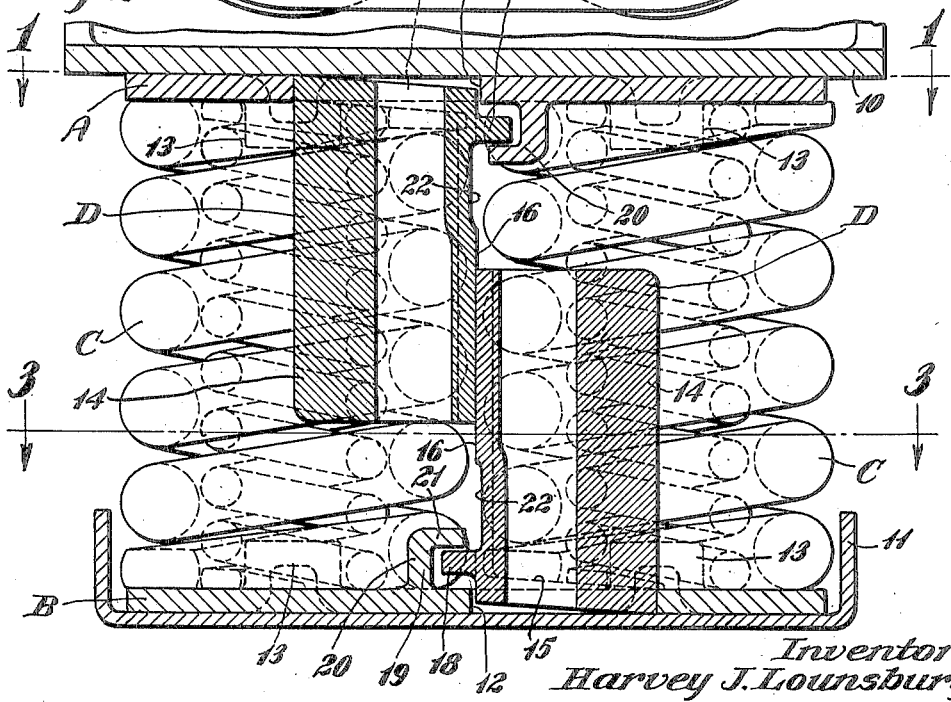

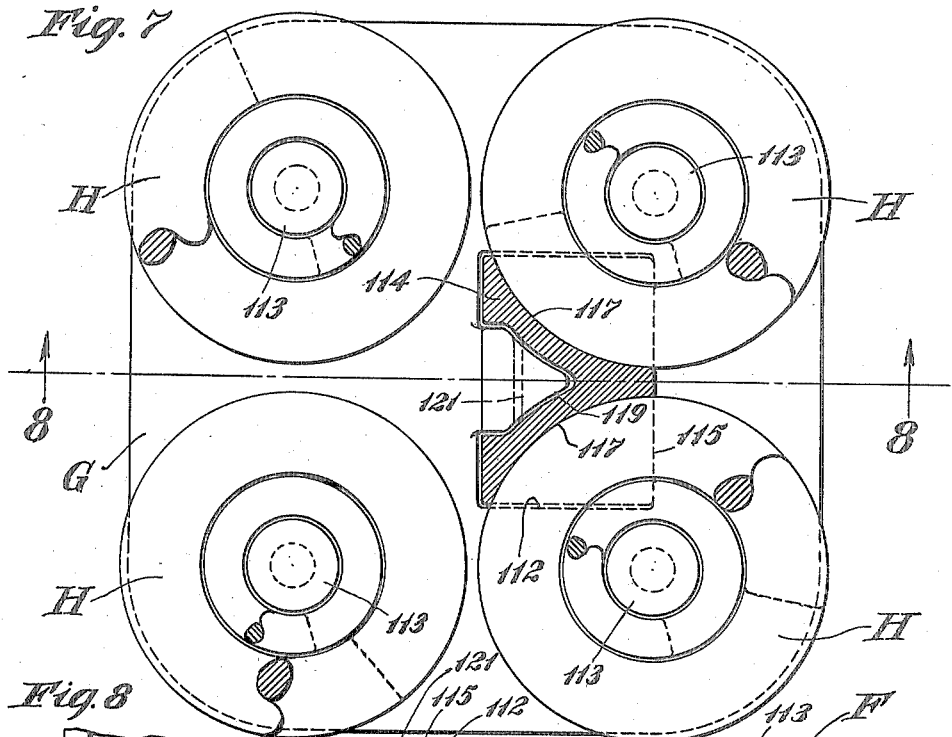
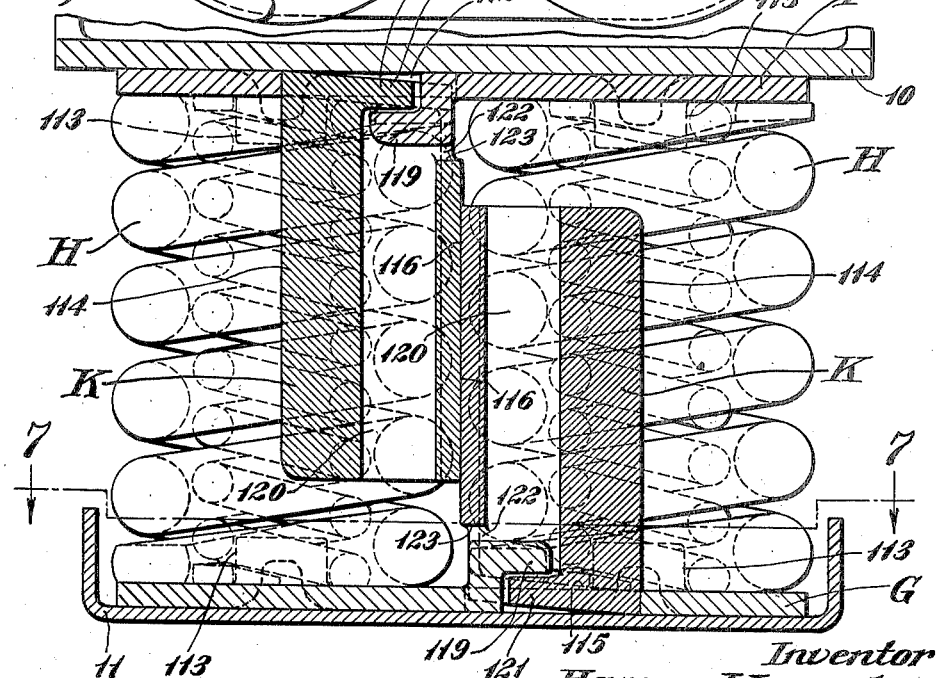

Patented Apr. 15, 1941

2,238,227

UNITED STATES PATENT OFFICE 2,238,227

COMBINED SPRING AND FRICTION SHOCK ABSORBER

Harvey J. Lounsbury, Glen Ellyn, Ill., assignor to W. H. Miner, Inc., Chicago, Ill., a corporation of Delaware Application March 29, 1939, Serial No. 264,704

5 Claims. (Cl. 267—9)

This invention relates to improvements in combined spring and friction shock absorbers, especially adapted for use in connection with railway car trucks.

One object of the invention is to provide a shock absorbing unit comprising a pair of relatively, longitudinally movable friction members pressed into tight frictional contact by rocking movement toward each other, through the action of spring means, wherein the friction members have rocker base portions seated in relatively movable spring plates and the spring plates and friction members have interengaing anchoring means thereon to prevent separation of said members from the spring plates and also restrict the extent of rocking movement of said members.

A more specific object of the invention is to provide a shock absorbing unit of the character specified in the preceding paragraph which is especially adapted for use in connection with railway car trucks for dampening the action of the truck springs.

Other objects of the invention will more clearly appear from the description and claims hereafter following.

In the drawings forming a part of this specification, Figure 1 is a top plan view of my combined spring and friction shock absorber. Figure 2 is a vertical sectional view, corresponding substantially to the line 2—2 of Figure 1, showing the mechanism mounted between the bolster and spring plank of a railway car truck, the bolster and spring blank being illustrated broken away. Figure 3 is a horizontal sectional view, corresponding substantially to the line 3—3 of Figure 2. Figures 4, 5, and 6 are front, side, and rear elevational views, respectively, of one of the friction members of the improved shock absorber. Figure 7 is a sectional view, similar to Figure 3, and corresponding substantially to the line 7—7 of Figure 8, illustrating another embodiment of the invention. Figure 8 is a vertical sectional view, corresponding substantially to the line 8—8 of Figure 7.

In said drawings, referring more particularly to Figures 2 and 8, 10 indicates the truck bolster and 11 the spring plank of the truck of a railway car to which my improvements are applied, the improved combined spring and friction shock absorber being interposed between said truck bolster and spring plank.

Referring first to the embodiment of the invention illustrated in Figures 1 to 6 inclusive, by improved combined spring and friction shock absorber comprises broadly top and bottom spring plates A and B, four spring units C—C—C—C; and a pair of friction elements D—D, said friction elements and spring plates having cooperating anchoring means thereon.

The top and bottom spring plates A and B are of similar design, each being of substantially rectangular outline and having rounded corners, as shown most clearly in Figure 1. Each spring plate is provided with a substantially rectangular opening 12 therethrough, providing a seat adapted to accommodate the base portion of one of the friction elements D, as hereinafter more fully described. The openings 12—12 of the top and bottom spring plates are respectively located at opposite sides of a vertical plane coincident with the vertical central axis of the mechanism. Each plate is provided with the usual inwardly projecting spring centering bosses 13—13—13—13 indicated in dotted lines in Figures 1 and 2. These bosses are four in number and are spaced symmetrically about the central vertical axis of the mechanism. The spring plates A and B are exact duplicates, being reversely arranged so that the openings or seats 12—12 thereof are located at opposite sides of the vertical central axis of the mechanism.

The spring units C—C—C—C preferably correspond in size and capacity to the units of the usual truck spring cluster of a railway car truck and in actual practice the standard spring units of a four spring cluster are employed. Each spring unit C comprises a relatively heavy outer coil and a lighter inner coil, the coils being interposed between the spring plates A and B with the inner coil of the unit centered by the corresponding bosses 13—13 of the top and bottom plates A and B.

The friction elements D—D are of like design, each being in the form of a casting comprising a postlike plate member 14 having a laterally projecting base flange or foot 15 at one end thereof. On the inner side, the plate or post member 14 of each element D is provided with a relatively wide, flat friction surface 16. As will be seen upon reference to Figures 1, 2, 5, and 6, the projecting base flange or foot member 15 extends from the side of the friction element opposite to the friction surface 16 thereof. The angle between the friction surface 16 and the bottom face of the foot member 15 is slightly in excess of a right angle, as clearly indicated in Figures 2, 3, and 5, whereby said foot member 15 is slightly inclined to the horizontal when the parts are assembled, thus providing for rocking lever action of the foot member on its support. The post or plate member 14 is cut away at opposite sides, as indicated at 17—17, to clear the corresponding pair of spring units C—C, as clearly shown in Figures 1, 3, and 6, the cut away portions being provided with inwardly curved surfaces corresponding with the curvature of the outer coils of the spring units C—C. The posts or plate members of the friction elements D—D thus are broadly of substantially triangular, transverse cross sectional outline.

The two friction elements D—D of the shock absorber have the friction surfaces 16—16 thereof in flat engagement and said elements are reversely arranged end for end, that is, with the base flange or foot member 15 of one of the elements D at the bottom of the mechanism and the base flange or foot member 15 of the other element D at the top of the mechanism. The base members 15—15 are respectively seated in the openings 12—12 of the top and bottom spring plates A and B. The shape of the base flanges 15—15 is such as to fit the openings 12—12 of the plates A and B, that is, they are of rectangular outline to seat in said openings, but sufficient clearance is provided between each base member and the side and end walls of the seat to allow the base member to have relatively free rocking movement within the seat. The springs C—C—C—C overlap the base members 15—15, one pair of springs C—C overlapping the base member 15 of one of said friction elements and the other pair of springs C—C of the cluster overlapping the base member 15 of the cooperating friction element. As will be evident, the base members of the friction elements D—D are thus subjected to the pressure of the springs and the tendency is to rock the friction elements toward each other to press the friction surfaces thereof into tight frictional engagement.

The top and bottom spring plates A and B bear respectively on the underneath surface of the truck bolster 10 and the top of the spring plank 11. The base portions 15—15 of the friction elements D—D engage through the openings 12—12 of the spring plates A and B and bear respectively on said bolster and spring plank. The friction elements D—D are thus held in tight frictional engagement with each other by the springs C—C due to the leverage action of the base members 15—15 which have rocking engagement at their outer ends with the cooperating faces of the truck bolster and spring plank. The post or plate member 14 of each friction element D is of lesser height than the distance between the spring plates A and B at the time that the springs C—C—C—C are in the expanded position shown in Figure 2. The upper end of the lower friction element D and the lower end of the upper friction element D are thus normally spaced from the inner sides of the top and bottom spring plates A and B, respectively. The clearance thus provided is sufficient to permit of the required compression of the springs C—C—C—C in service.

To prevent accidental separation of the friction elements D—D from the spring plates A and B when the mechanism is assembled, each element D is provided with a lug 18 cooperating with a retaining member or lip 19 formed on the corresponding spring plate. As shown most clearly in Figures 2, 3, 4, and 5, the retaining lug 18 is relatively wide and projects at right angles from the front side of the platelike post member of the friction element D and is located near the foot end thereof. As shown in Figure 2, the lug 18 extends in a direction opposite to the foot 15 and overhangs the metal of the spring plate at the opening 12 of said plate. As shown, sufficient clearance is provided between the lug 18 and the adjacent surface of the spring plate to permit the required rocking movement of the friction element, but prevent excessive outward displacement of the friction element through the spring plate when said plate is removed from contact with either the bolster or spring plank, as the case may be. The retaining member 19 is of hook-shaped vertical cross section, as clearly shown in Figure 2, and comprises an outstanding web 20 at right angles to the inner face of the corresponding spring plate A or B, and an angular extending lip 21 projecting from said web and overhanging the lug 18 of the corresponding friction element D. As shown most clearly in Figures 2 and 5, the front face of the friction element is cut away for a short distance, inwardly of the lug 18, thereby providing an inset surface 22 beyond the friction surface 16 of said element. As will be evident, the cooperating friction surface portions 16—16 of the two friction members D—D being thus raised with respect to the remaining surface portions of said friction surfaces allow for a maximum amount of wear of the friction surfaces without danger of the outer end portion of one friction element gouging into the friction surface of the other element.

The operation of my improved mechanism shown in Figures 1 to 6 inclusive is as follows: Upon relative approach of the spring plank and truck bolster, the coils of the group or cluster of springs C—C—C—C are compressed between the plates A and B. At the same time, the friction elements D—D are forced to slide relatively lengthwise on each other, being actuated respectively by the spring plank and bolster. A friction snubbing action is thus produced during compression of the springs. During recoil of the springs, the friction elements are returned to the normal position shown in Figure 2, the base members 15—15 of the friction elements being moved outwardly away from each other with the spring plates by the recoil of the springs. The recoiling action of the springs is dampened or snubbed by the friction elements D—D which are held in tight frictional engagement through the spring pressure acting on the rocking arm or base portions of the friction elements. As will be evident, as the springs are being compressed the frictional resistance produced by the relative movement of the elements D—D is augmented due to the increased pressure of the springs on the arms or base portions 15—15. As the springs recoil, the frictional resistance is progressively reduced due to the reduction of the spring pressure on the rocking friction elements.

The retaining means, comprising the retaining lugs 18—18 and hook-shaped retaining members 19—19, serves to prevent accidental displacement of the parts with respect to each other in service which might result in binding of the friction elements, by preventing each friction element D from being displaced either upwardly or downwardly with respect to the associated spring plate to an extent which would permit the foot 15 to be unseated from the opening 12. For example, in the event that the top spring plate accidentally drops away from the bolster or the bottom spring plate accidentally jumps upwardly with respect to the spring plank, due to the car being subjected to violent jars, my improved retaining means successfully maintains the friction elements in proper operative position because of the limited bodily displacement permitted between each friction element and the associated spring plate by said retaining means.

Referring to the embodiment of the invention illustrated in Figures 7 and 8, the improved friction shock absorber comprises top and bottom spring plates F and G, four spring units H—H—H—H; and a pair of friction elements K—K, and cooperating anchoring means on the spring plates and friction elements, which anchoring means is of a different character than that disclosed in Figures 1 to 6 inclusive.

The top and bottom spring plates F and G are of similar design, each being of substantially rectangular outline and having rounded corners similar to the spring plates A and B hereinbefore described. Each spring plate is provided with a substantially rectangular opening 112 therethrough, providing a seat adapted to accommodate the base portion of one of the friction elements K in a manner similar to the friction element D, hereinbefore described. The openings 112—112 of the top and bottom spring plates are respectively located at opposite sides of a vertical plane coincident with the vertical central axis of the mechanism. These plates bear on the top and bottom ends of the spring units H—H—H—H which are interposed between the plates. The spring units H—H—H—H are in all respects similar to the units C—C—C—C, hereinbefore described, and are held centered by bosses 113 on the spring plates identical with the bosses 13 of the spring plates A and B.

The friction elements K—K are of like design, each being in the form of a casting comprising a postlike member 114 having a laterally projecting base flange or foot 115 at one end thereof corresponding to the foot 15 of the friction member D, hereinbefore described, and arranged and operating in a similar manner. On the inner side, that is, the side remote from the foot 115 of the friction member, the plate or post 114 of the element K is provided with a relatively wide, flat friction surface 116. The post or plate member 114 is cut away at opposite sides, as indicated at 117—117 to clear the corresponding pair of spring units H—H in a manner similar to the post of the friction member D, hereinbefore described.

The friction elements K—K are similarly arranged to the friction elements D—D of the embodiment of the invention illustrated in Figures 1 to 6 inclusive and operate in a similar manner, the friction surfaces 116—116 of the friction elements K—K being in sliding contact with each other and pressed together by the rocking action of said elements under pressure of the springs H—H—H—H.

The upper end of the lower friction element K and the lower end of the upper friction element K are normally spaced from the inner sides of the top and bottom spring plates F and G, respectively. The clearance thus provided is sufficient to permit the required compression of the springs H—H—H—H in service, without the springs going solid. The springs are prevented from being unduly compressed and going solid by engagement of the ends of the friction elements K—K with the respective spring plates, the friction elements serving as column members to sustain the load.

To prevent accidental separation of the friction elements K—K from the spring plates F and G, when the mechanism is assembled, each spring plate is provided with an anchoring lug or lip 119 having shouldered engagement with the corresponding friction element K to restrict upward and downward movement of said element with respect to the plate. As shown in Figures 7 and 8, the lug or lip 119 of each plate overhangs the opening 112 of said plate and is of the general outline in plan, as shown in Figure 7. The lug of the bottom plate G is offset upwardly with respect to the plane of said plate and the lug of the top plate F is offset downwardly as clearly shown in Figure 8. The postlike member 114 of each friction element is provided with a vertical core opening 120, the core opening of the post of the bottom friction element K being partly closed at its lower end by a horizontal web or shelf 121 which serves as a shoulder cooperating with the lug 119 of the spring plate G, and the core opening of the post of the top friction element being partly closed at its upper end by a like web 121 cooperating with the lug 119 of the spring plate F. The wall of the core opening at the friction face side of the post of each friction element K is cut away or slotted, as indicated at 122, to accommodate the lug 119 of the corresponding spring plate. The upper wall of the slot of the post of the bottom friction element K and the bottom wall of the slot of the post of the upper friction element K provide limiting shoulders 123—123 cooperating with the lugs 119—119 of the plates G and F. As shown, sufficient clearance is provided between the lug 119 of each spring plate and the shoulder 123 of the corresponding friction element to permit the required rocking movement of the friction element, but prevent excessive outward displacement of the friction element through the spring plate when the plate is removed from contact with either the bolster or the spring plank, as the case may be. Engagement between the lug 119 of the spring plate with the shoulder formed by the web 121 of the corresponding friction element prevents relative movement in a vertical direction of these parts, to an extent which would permit the foot of the friction element to leave its seat in the spring plate.

I have herein shown and described what I now consider the preferred manner of carrying out my invention, but the same is merely illustrative and I contemplate all changes and modifications that come within the scope of the claims appended hereto.

I claim:

1. In a shock absorber, the combination with a pair of relatively movable friction elements in lengthwise sliding frictional contact with each other and interposed between a pair of relatively movable members, said elements having base portions in rocking bearing engagement respectively with said members and directly actuated to slide relatively to each other by engagement with said members; of plates having openings in which said base portions are seated, said plate members bearing on said relatively movable members respectively; cooperating retaining means on each friction element and associated plate for limiting relative displacement of the same to retain the base portion of said element seated in said plate; and spring means interposed between said plates and having bearing engagement with said base portions of said elements respectively for rocking both of said elements and pressing the latter into tight frictional contact, said spring means directly resisting relative longitudinal movement of said friction elements toward each other and holding said base portions seated on said members and thereby relieving said retaining means from actuating strains.

2. In a shock absorber interposed between two relatively movable members to yieldingly resist relative approach thereof, the combination with opposed spring plates bearing on said members respectively, each plate having an opening therethrough; of a pair of friction elements in lengthwise sliding engagement with each other, each element having a rocker base portion integral therewith, said base portions being seated in the openings of said plates respectively and having rocking bearing engagement with said members; cooperating anchoring means on each friction element and associated plate comprising a lug on one of the same and a lip on the other overhanging said lug; and springs interposed between and engaging said spring plates and overlapping said base portions of the friction elements to rock the latter into tight frictional engagement with each other and yieldingly oppose relative sliding movement of said elements and force said elements apart lengthwise, thereby relieving the anchoring means from strain.

3. In a shock absorber interposed between two relatively movable members to yieldingly resist relative approach thereof, the combination with opposed interengaging, relatively lengthwise slidable friction elements, each having an elongated friction plate element provided with a base flange at one end, said friction plates being in face to face contact and the base flange of one of said elements being in rocking engagement with one of said members, and the base flange of the other plate being in rocking engagement with the other member; of spring plates surrounding said base flanges of said elements respectively and bearing respectively on said members; a projecting anchoring lug on each friction element at the end portion thereof which has the base flange, said lug being spaced inwardly from said end of said element and overhanging the body of the associated spring plate in slightly spaced relation thereto; a retaining hook on the associated spring plate extending over said lug and normally out of contact therewith; and springs interposed between said spring plates and bearing on said base flanges of said elements for rocking the friction plates thereof into tight frictional engagement with each other and yieldingly resisting relative sliding movement of said elements toward each other.

4. In a shock absorber adapted to be interposed between two relatively movable members, the combination with a pair of opposed, spaced, relatively movable spring plates, each plate having an opening therethrough, the opening of one plate being disposed at one side of the central longitudinal axis of the device, and the opening of the other plate being disposed at the opposite side of said axis; of a hooked retaining member on each plate adjacent the inner side of the opening thereof; a pair of friction elements, each comprising a base portion and an upstanding post on said base portion, said post of said elements being in sliding frictional bearing engagement with each other, one of said elements having the base flange thereof seated in the opening of one of said spring plates and the other element having its base flange seated in the opening of the other plate; a lug on the post of each friction element adjacent the base portion thereof but spaced inwardly from said base of said element, said lug of each element overhanging the body of the associated spring plate and projecting into the space between said plate and the hook of the retaining element of said plate; and springs interposed between said spring plates and bearing on the base flanges of said elements for rocking the latter into tight frictional engagement and yieldingly holding said base portions seated on said members throughout normal actuation of the mechanism.

5. In a shock absorber interposed between two relatively movable members to yieldingly resist relative approach thereof, the combination with opposed, relatively, longitudinally movable friction elements in sliding contact with each other, each element being slotted and having a base portion in rocking engagement with the corresponding movable member; of spring plates bearing on said members respectively, each spring plate having an opening therethrough in which the base portion of one of said elements is seated; springs interposed between said spring plates, said springs pressing the base portions of the friction elements to rock said elements into frictional contact with each other; and a lug on each spring plate overhanging the opening of said plate and extending into the slot of the corresponding friction element to anchor said element to the plate for restricted relative movement.

HARVEY J. LOUNSBURY.